US012510939B2

(12) United States Patent
Zhang et al.

(10) Patent No.: US 12,510,939 B2
(45) Date of Patent: Dec. 30, 2025

(54) MODULAR COMPUTING APPARATUS WITH INTEGRATED POWER AND SIGNAL ROUTING

(71) Applicant: Canaan Creative Co., LTD., Beijing (CN)

(72) Inventors: Shaohua Zhang, Beijing (CN); Nangeng Zhang, Beijing (CN)

(73) Assignee: Canaan Creative Co., LTD., Beijing (CN)

( * ) Notice: Subject to any disclaimer, the term of this patent is extended or adjusted under 35 U.S.C. 154(b) by 82 days.

(21) Appl. No.: 17/991,121

(22) Filed: Nov. 21, 2022

(65) Prior Publication Data

US 2023/0085383 A1    Mar. 16, 2023

Related U.S. Application Data

(63) Continuation of application No. PCT/CN2021/095102, filed on May 21, 2021.

(30) Foreign Application Priority Data

May 22, 2020   (CN) .......................... 202020886918.1
May 22, 2020   (CN) .......................... 202020887315.3

(51) Int. Cl.
*G06F 1/18*      (2006.01)
*G06F 1/20*      (2006.01)
*H05K 7/20*      (2006.01)

(52) U.S. Cl.
CPC ............... *G06F 1/181* (2013.01); *G06F 1/20* (2013.01); *H05K 7/20163* (2013.01); *H05K 7/20172* (2013.01)

(58) Field of Classification Search
None
See application file for complete search history.

(56) References Cited

U.S. PATENT DOCUMENTS 6,259,600 B1 *   7/2001   Talbot ...................... G06F 1/20
                                                   361/679.54
10,644,490 B2 *  5/2020   Kawamura ............. H02G 3/16
(Continued)

FOREIGN PATENT DOCUMENTS

CN          2591662 Y       12/2003
CN        109885142 A        6/2019
(Continued)

OTHER PUBLICATIONS

Machine Translation of foreign document CN-111007924-A (Year: 2020).*
Machine Translation of foreign document WO-2019228420-A1 (Year: 2019).*
Machine Translation of foreign document CN-210270727-U (Year: 2020).*
Machine Translation of CN210270727U (Year: 2025).*
(Continued)

*Primary Examiner* — Allen L Parker
*Assistant Examiner* — Peter Krim
(74) *Attorney, Agent, or Firm* — Sheppard Mullin Richter & Hampton LLP

(57) ABSTRACT

Disclosed is a computing device, comprising a frame, a computing apparatus, a controller, a power source and a heat dissipation device, wherein the computing apparatus is arranged in the frame and comprises a power source interface; the power source comprises a power source connection end, and also comprises a connection box connected to the frame; the power source interface extends from the frame into the connection box; the power source connection end extends into the connection box; and the power source interface and the power source connection end are connected in the connection box via one or more conducting bars.

14 Claims, 8 Drawing Sheets

(56) References Cited

U.S. PATENT DOCUMENTS

| | | | | |
|---|---|---|---|---|
| 2006/0047466 A1* | 3/2006 | White | ............... | H05K 7/20745 702/130 |
| 2014/0085807 A1 | 3/2014 | Ning et al. | | |
| 2014/0293523 A1 | 10/2014 | Jau et al. | | |
| 2019/0073006 A1* | 3/2019 | Chang | ..................... | G06F 1/206 |
| 2021/0341976 A1* | 11/2021 | Helberg | ............. | H05K 7/20163 |

FOREIGN PATENT DOCUMENTS

| | | | | |
|---|---|---|---|---|
| CN | 110174932 A | | 8/2019 | |
| CN | 110196623 A | | 9/2019 | |
| CN | 110825191 A | | 2/2020 | |
| CN | 210109704 U | | 2/2020 | |
| CN | 210109706 U | | 2/2020 | |
| CN | 210109707 U | | 2/2020 | |
| CN | 111007924 A | * | 4/2020 | |
| CN | 210270727 U | * | 4/2020 | |
| CN | 212112282 U | | 12/2020 | |
| CN | 212112326 U | | 12/2020 | |
| WO | WO-2019228420 A1 | * | 12/2019 | ............... G06F 1/18 |

OTHER PUBLICATIONS

Machine Translation of WO2019228420A (Year: 2025).*
Machine Translation of CN111007924A (Year: 2025).*
International Search Report and Written Opinion for PCT/CN2021/095102 dated Aug. 25, 2021, 14 pages.
Antminer S17+ 73th. Review of the new miner from Bitmain. Consumption metering. YouTube [online] [video], MinerWorld Miner store, Apr. 1, 2020 [Oct. 10, 2023] Found <https://www.youtube.com/watch?v=T5NWW60MIrw>, time 1:49.
Search Report issued for Eurasian Application No. 202391423, published Dec. 31, 2023, 3 pages.
Search Report issued for European Application No. 21809593.3, dated Oct. 11, 2024, 7 pages.
Examination Report for EP Patent Application No. 21809593.3, mailed Apr. 17, 2025, 7 pages.
Office Action for Japanese Patent Application No. 2022-562775 mailed Jan. 21, 2025, 7 pages.
Examination Report for EP Patent Application No. 21809593.3, mailed Nov. 13, 2025, 5 pages.

* cited by examiner

MODULAR COMPUTING APPARATUS WITH INTEGRATED POWER AND SIGNAL ROUTING

CROSS REFERENCE TO RELATED APPLICATIONS

This application is a continuation application of International Patent Application No. PCT/CN2021/095102, filed on May 21, 2021 and titled "COMPUTING DEVICE," which claims priority to Chinese Patent Application No. 202020887315.3 filed on May 22, 2020 and Chinese Patent Application No. 202020886918.1 filed on May 22, 2020. The contents of all the above-identified applications are incorporated herein by reference in their entirety.

TECHNICAL FIELD

This application relates to the technical field of data computing, and in particular, to a computing device with greater safety.

BACKGROUND

A computing device is an electronic device for high-speed computing, such as an electronic device configured to run a specific algorithm and communicate with a remote server to obtain corresponding virtual currency. The progress of the existing industry has promoted the development of automation and intelligence of computing devices, and various replacement products have emerged one after another. However, many designs of existing computing devices still have exposed connecting wires, which affect the safety.

SUMMARY

An objective of this application is to provide a computing device with higher safety.

To achieve the foregoing objective, the computing device in this application includes a frame, a computing apparatus, a controller, a power source, and a heat dissipation device, where the computing apparatus is arranged in the frame; the power source, the controller, and the heat dissipation device are connected outside the frame; the computing apparatus includes a power source interface; and the power source includes a power source connection end. The computing device further includes a connection box arranged on the frame and the power source, where the power source interface extends into the connection box from a top end of the frame; the power source connection end extends into the connection box; and the power source interface and the power source connection end are connected in the connection box via one or more conducting bars.

In an implementation of the computing device described above, the computing apparatus includes a signal interface; the controller includes a signal connection end; the controller is arranged in the connection box; and the signal interface and the signal connection end are connected in the connection box via signal wire.

In an implementation of the computing device described above, the connection box includes an upper cover plate and a bottom cover body, and the upper cover plate covers the bottom cover body to seal the connection box.

In an implementation of the computing device described above, the frame is an integrally formed aluminum piece.

In an implementation of the computing device described above, the frame includes a first side wall, a second side wall, a top wall, and a bottom wall. The first side wall and the second side wall are supported between the top wall and the bottom wall.

In an implementation of the computing device described above, an outer portion of the first side wall is provided with a power source slide rail transversely arranged; a power source bracket is connected to the first side wall through the power source slide rail; and the power source is attached to the power source bracket.

In an implementation of the computing device described above, the bottom wall is provided with a computing board bottom slide rail transversely arranged, and the computing apparatus is configured to slide into or out of the frame through the computing board bottom slide rail.

In an implementation of the computing device described above, the computing apparatus includes a heat sink, and the heat sink is provided with a groove configured to engage with the computing board bottom slide rail.

In an implementation of the computing device described above, the top wall is provided with a notch transversely arranged; the power source interface of the computing apparatus protrudes above the frame through the notch and extends into the connection box; and the signal interface of the computing apparatus protrudes above the frame through the notch and extends into the connection box.

In an implementation of the computing device described above, the top wall is provided with a computing board top slide rail corresponding to the computing board bottom slide rail, and the computing board top slide rail is formed by extrusion of an aluminum material at a side of the notch.

In an implementation of the computing device described above, a plurality of computing assemblies are arranged in parallel, and the conducting bar is configured to connect the plurality of computing assemblies in sequence.

In an implementation of the computing device described above, the heat dissipation device includes a first fan and a second fan. The frame is hollowed out at a front end and a rear end. The first fan and the second fan are connected to the front end and the rear end of the frame respectively to block the front end and the rear end of the frame.

This application further provides a computing device, including a frame, a computing apparatus, a controller, a power source, and a heat dissipation device, where the computing apparatus is arranged in the frame and includes a power source interface, and the power source includes a power source connection end. The computing device further includes a connection box connected to the frame, where the power source interface extends into the connection box from the frame; the power source connection end extends into the connection box; the power source interface and the power source connection end are connected in the connection box via one or more conducting bars; and the connection box is provided with an access in communication with the frame.

In an implementation of the computing device described above, the frame is provided with an access side for the computing apparatus to slide out or slide in as a whole, and the connection box is arranged at the access side or at another side of the frame that is different from the access side.

In an implementation of the computing device described above, the power source, the controller, and the heat dissipation device are arranged in the frame, or at least one of the power source, the controller, and the heat dissipation device forms a part of the frame.

This application is described in detail below with reference to the accompanying drawings and specific embodiments, which should not be construed as a limitation on this application.

REFERENCE NUMERALS

Figure 1:
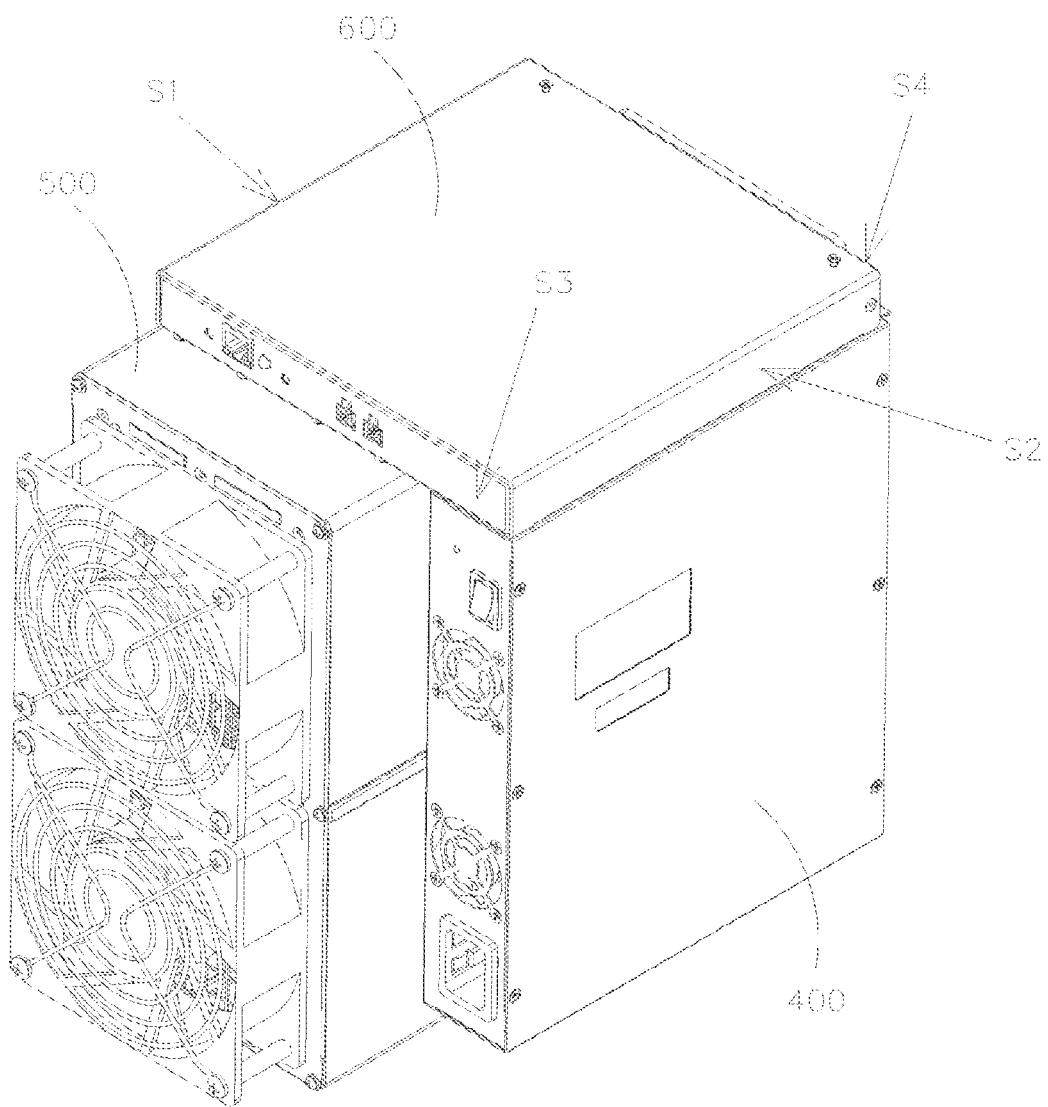
FIG. 1 is a three-dimensional structural diagram of a computing device according to an embodiment of this application.

100: Frame
110: First side wall
111: Power source slide rail
120: Second side wall
130: Top wall
131: Notch
132: Computing board top slide rail
140: Bottom wall
141: Computing board bottom slide rail
200: Computing apparatus
210: Power source interface
220: Signal interface
230: Heat sink
231: Groove
232: Groove
240: Computing board
300: Controller
310: Signal connection end
400: Power source
410: Power source connection end
500: Heat dissipation device
510: First fan
520: Second fan
600: Connection box
600S: Access
610: Upper cover plate
620: Bottom cover body
700: Conducting bar
800: Power source bracket
900: Signal wire
X: Transverse direction
S1, S2, S3, S4: Side

DETAILED DESCRIPTION

The technical solutions of this application are described in detail below with reference to the accompanying drawings and specific embodiments to provide a further understanding of the objectives, solutions, and effects of this application, but are not intended to limit the protection scope of the appended claims of this application.

References in this specification to "an embodiment," "another embodiment," "this embodiment," and the like mean that the described embodiment may include particular features, structures, or characteristics, but not every embodiment necessarily includes those particular features, structures, or characteristics. In addition, such expressions are not referring to the same embodiment. Further, when a particular feature, structure, or characteristic is described in conjunction with an embodiment, whether or not explicitly described, it has been shown that it is within the knowledge of a person skilled in the art to incorporate such feature, structure, or characteristic into other embodiments.

Certain terms are used in the description and the following claims to refer to particular assemblies or components, and a person of ordinary skill in the art should understand that technical users or manufacturers may refer to the same assembly or component by different terms. This specification and the following claims do not use the difference in name as a way of distinguishing assemblies or components, but use the difference in function of the assemblies or components as a criterion for distinction. The terms "include" and "comprise" mentioned throughout this specification and the following claims are open terms and therefore should be explained as "include but not limited to." In addition, the term "connection" herein includes any direct or indirect means of connection.

It should be noted that, in the description of this application, a direction or location relationship indicated by a term such as "transverse," "longitudinal," "on," "under," "front," "rear," "left," "right," "vertical," "horizontal," "top," "bottom," "inner," "outer," or the like is a direction or location relationship shown based on the accompanying drawings, and is intended only to conveniently describe this application and simplify the description, but is not intended to indicate or imply that a mentioned apparatus or element needs to have a particular direction and is constructed and operated in the particular direction. Therefore, the direction or location relationship cannot be understood as a limitation on this application. For the convenience of clear description, the order terms "first," "second," "third," "fourth," and the like mentioned herein are used for setting apart an element, a region, or a component from another identical or similar element, region, or component, rather than limiting the element, region, or component.

Figure 2:
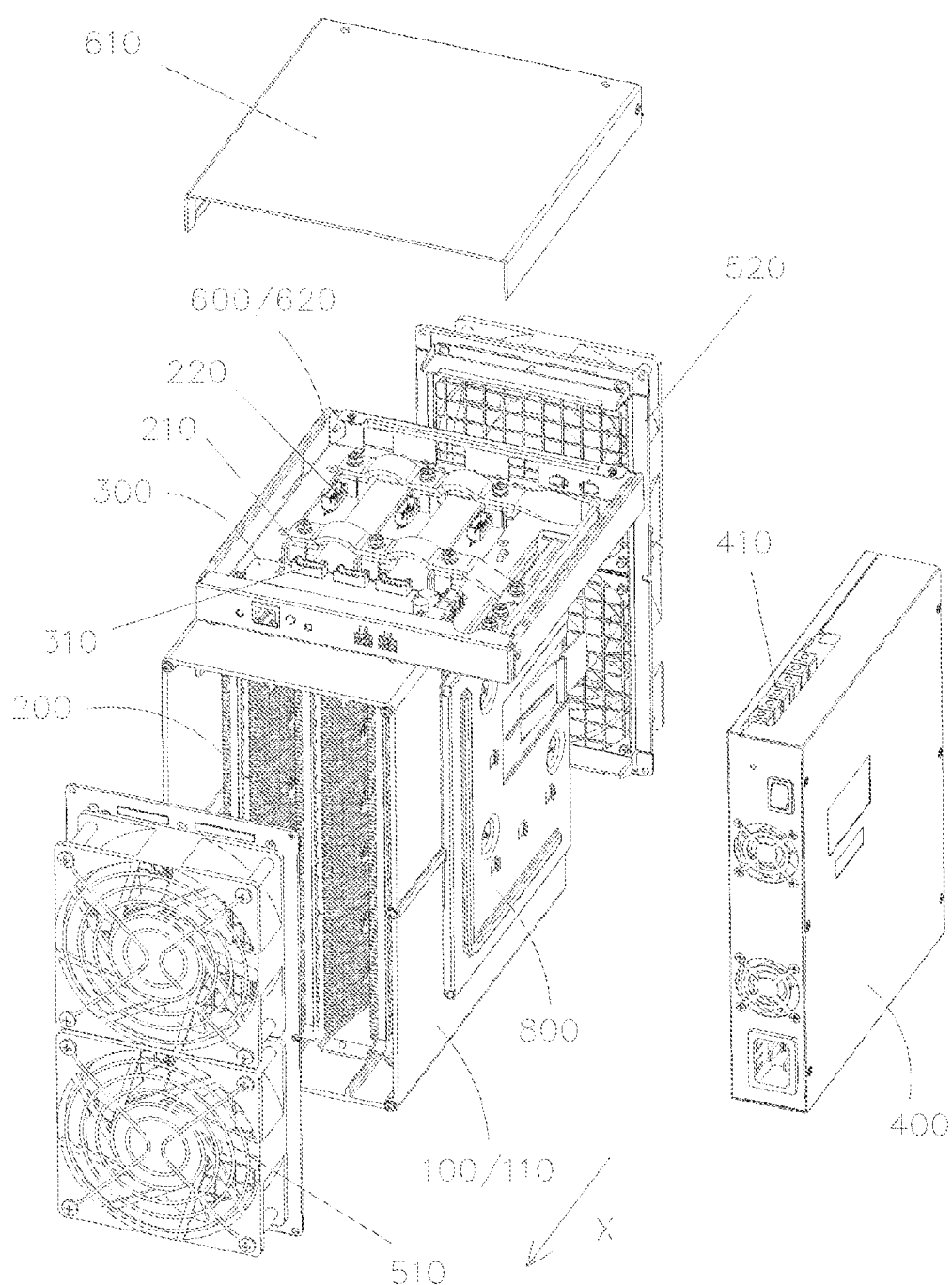
FIG. 2 is an exploded view of FIG. 1.

As shown in FIG. 1 and FIG. 2, FIG. 1 and FIG. 2 are respectively a three-dimensional structural diagram and an exploded view of a computing device according to an embodiment of this application. The computing device of this application includes a frame 100, a computing apparatus 200, a controller 300, a power source 400, and a heat dissipation device 500. The computing apparatus 200 is arranged in the frame 100. The power source 400, the controller 300, and the heat dissipation device 500 are connected outside the frame 100. For example, the power source 400 is attached to a side of the frame 100; the heat dissipation device 500 is connected to a front end and a rear end or one of the ends of the frame 100; the controller 300 is arranged in a sealed box at an upper side of the frame 100.

The computing device of this application further includes a connection box 600, and the connection box 600 is arranged on the frame 100 and at an upper side of the power source 400.

In some embodiments, an upper portion of the frame 100 is even with an upper portion of the power source 400 to facilitate the arrangement of the connection box 600.

In some embodiments, as shown in FIG. 1, a left side S1 and a right side S2 of the connection box 600 are even with a left side of the frame 100 and a right side of the power source 400 respectively. A front side S3 and a rear side S4 of the connection box 600 are even with a front side and a rear side of the power source 400 respectively. The overall structure of the computing device is well-defined.

Figure 3:
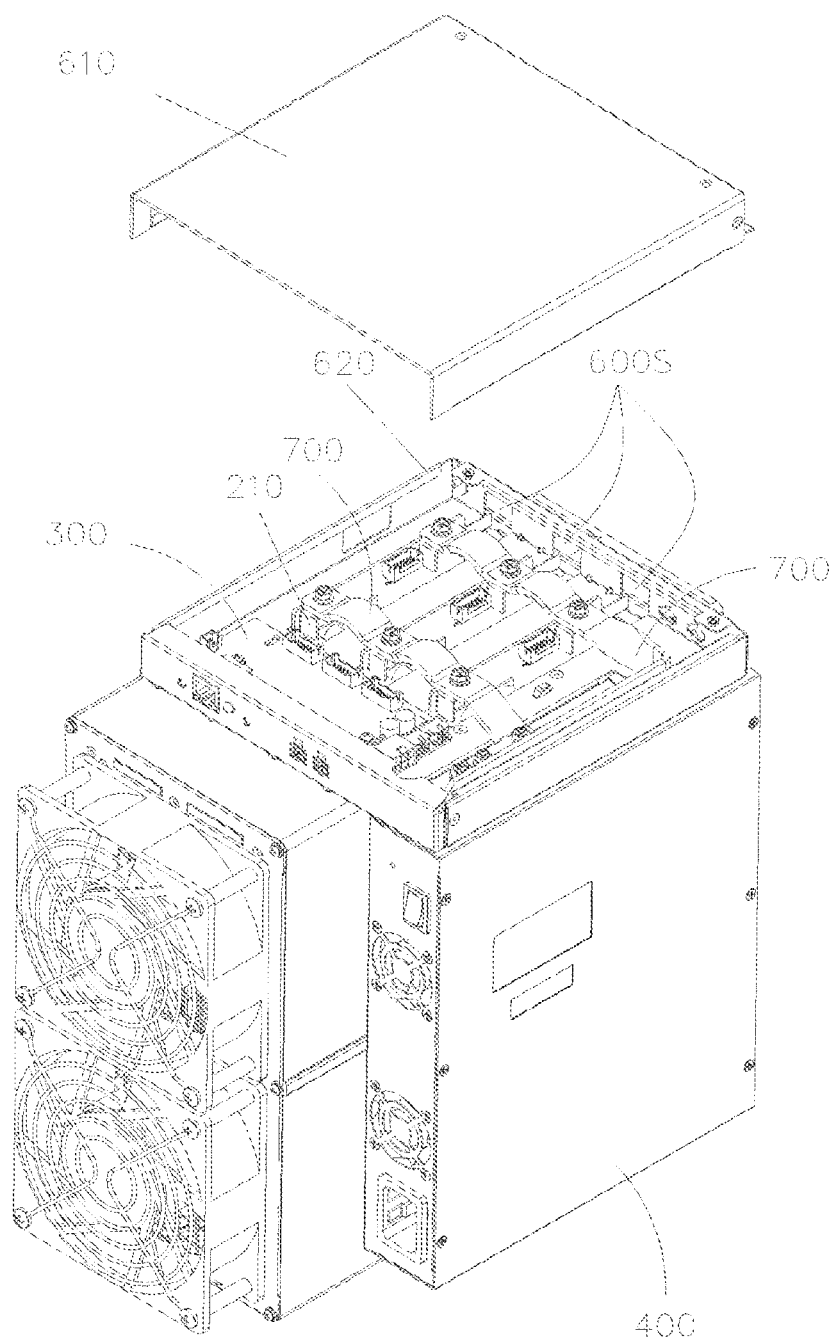
FIG. 3 is a three-dimensional structural diagram of a computing device with an upper cover plate of a connection box being opened according to an embodiment of this application.

As shown in FIG. 2 and FIG. 3, FIG. 3 is a three-dimensional structural diagram of a computing device with an upper cover plate of a connection box being opened according to an embodiment of this application. The controller 300 is arranged in the connection box 600 of the frame 100. The computing apparatus 200 includes a power source interface 210, and the power source interface 210 extends into the connection box 600 from a top end of the frame 100. The power source 400 includes a power source connection end 410, and the power source connection end 410 extends into the connection box 600 at an upper side. The power source connection end 410 of the power source 400 and the power source interface 210 of the computing apparatus 200 are connected in the connection box 600 via one or more conducting bars 700.

Figure 4:
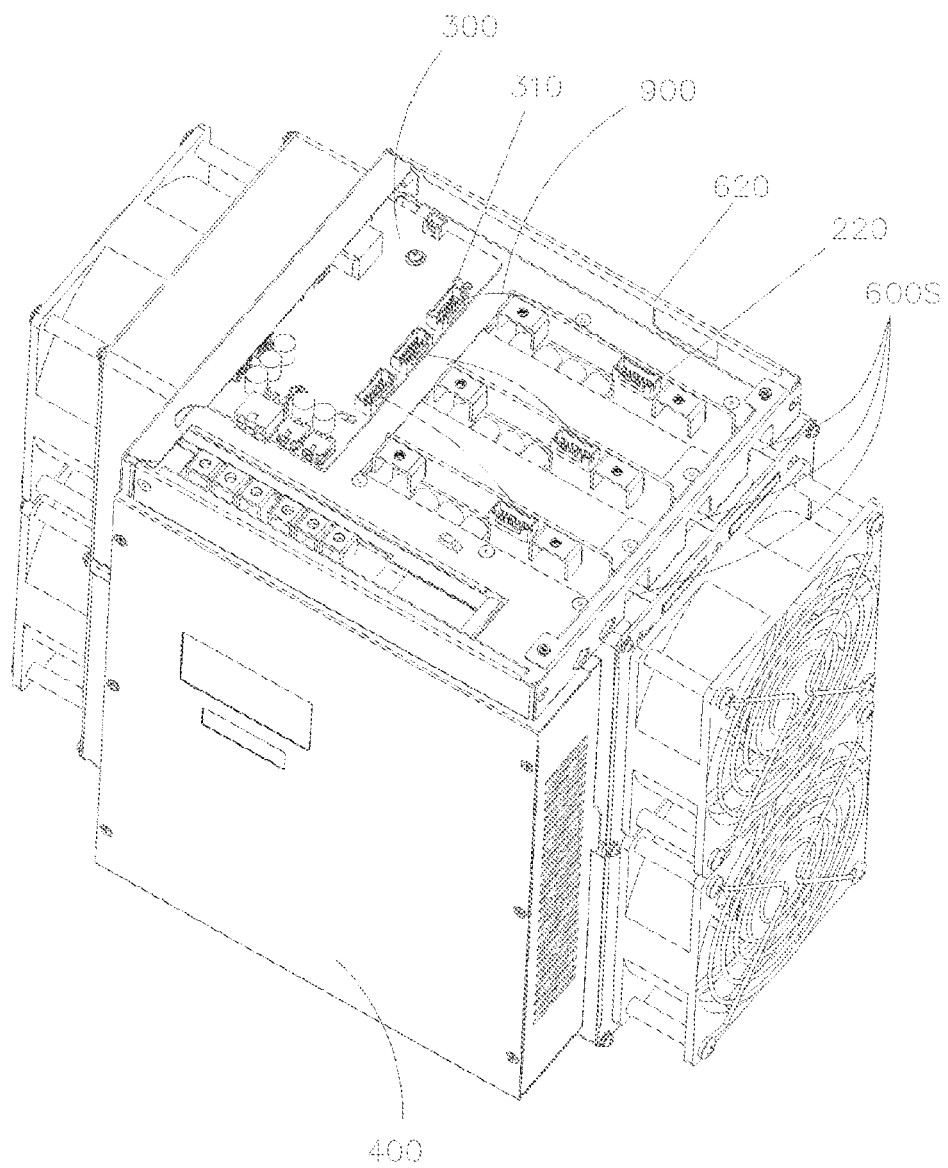
FIG. 4 is a three-dimensional structural diagram of a computing device with an upper cover plate of a connection box being removed according to an embodiment of this application.

As shown in FIG. 3 and FIG. 4, FIG. 4 is a three-dimensional structural diagram of a computing device with an upper cover plate of a connection box being removed to display a signal connection structure between a controller and a computing apparatus according to an embodiment of this application. The connection box 600 includes an access 600S, and the access 600S is in communication with the frame 100. When needed, the computing apparatus 200 can be pulled out from the frame 100 by detaching the conducting bar 700 and related signal wires without detaching other frame structures such as the connection box 600. As shown in FIG. 2 to FIG. 4, the computing apparatus 200 includes a signal interface 220, and the signal interface 220 extends into the connection box 600 from the top end of the frame 100. The controller 300 includes a signal connection end 310, and the signal connection end 310 extends into the connection box 600 at the upper side. The signal connection end 310 of the signal module 30 and the signal interface 220 of the computing apparatus 200 are in electrical connection in the connection box 600 via signal wire 900.

The computing device of this application is provided with a sealable connection box. A control board and a control interface between the control board and a computing board are connected in the connection box, and a power source and a power source wire of the computing board are connected in the connection box. Thus, power source connection wires and signal wires are prevented from being exposed, which improves safety; moreover, the connection box is arranged at a top end of a device, so as to facilitate operations.

As shown in FIG. 2, the connection box 600 includes an upper cover plate 610 and a bottom cover body 620, and the upper cover plate 610 covers the bottom cover body 620 to seal the connection box 600.

Figure 5:
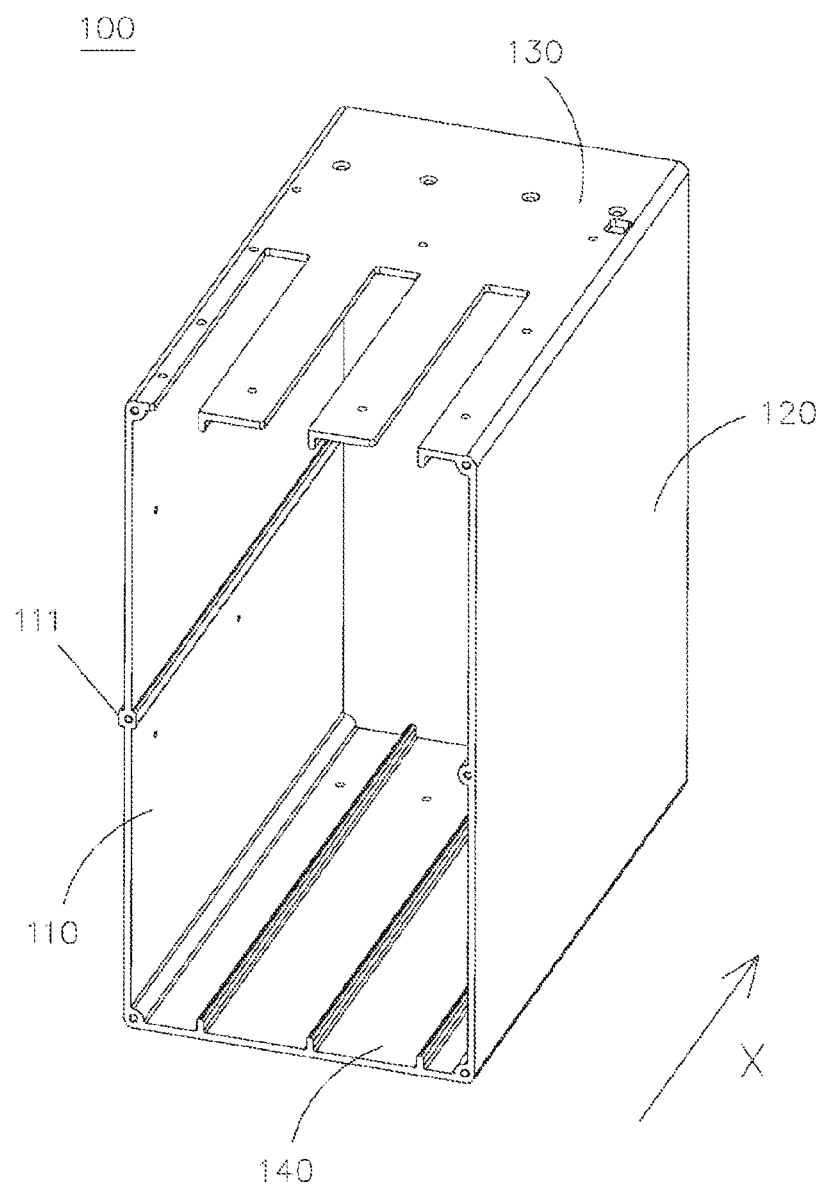
FIG. 5 is a three-dimensional structural diagram of a frame of a computing device according to an embodiment of this application.

FIG. 5 is a three-dimensional structural diagram of a frame of a computing device according to an embodiment of this application. The frame 100 of the computing device of this application is an integrally formed aluminum piece that does not need mounting, and is low in cost and high in strength. The frame 100 includes a first side wall 110, a second side wall 120, a top wall 130, and a bottom wall 140. The first side wall 110 and the second side wall 120 are supported between the top wall 130 and the bottom wall 140.

The first side wall 110, the second side wall 120, the top wall 130, and the bottom wall 140 form a circumferential wall of the frame 100, and the frame 100 is hollowed out at a front end and a rear end. With reference to FIG. 2, the heat dissipation device 500 includes a first fan 510 and a second fan 520. The first fan 510 and the second fan 520 are connected to the front end and the rear end of the frame 100 respectively to block the front end and the rear end of the frame 100.

An outer portion of the first side wall 110 is provided with a power source slide rail 111 arranged along a transverse direction X. With reference to FIG. 2, a power source bracket 800 is connected to the first side wall 110 through the power source slide rail 111, and the power source 400 is attached to the power source bracket 800.

Figure 6:
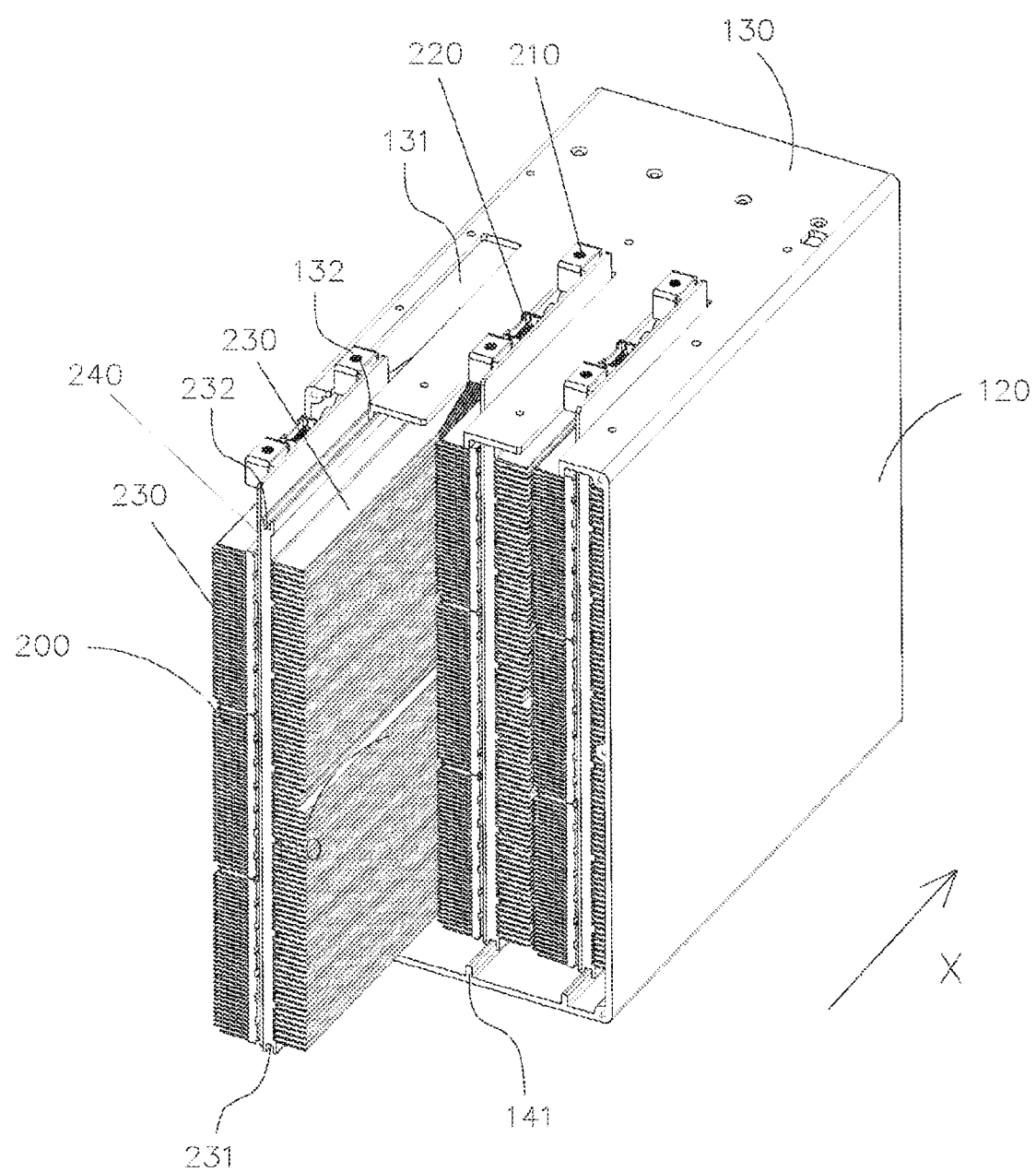
FIG. 6 is a three-dimensional structural diagram of a computing apparatus of a computing device connected to a frame according to an embodiment of this application.

With reference to FIG. 5 and FIG. 6, FIG. 6 is a three-dimensional structural diagram of a computing apparatus of a computing device connected to a frame according to an embodiment of this application. The bottom wall 140 includes a computing board bottom slide rail 141 arranged along the transverse direction X, and the computing apparatus 200 is configured to slide into the frame 100 or slide out of the frame 100 through the computing board bottom slide rail 141.

The computing apparatus 200 includes a heat sink 230 and a computing board 240. The heat sink 230 is attached to the computing board 240 to dissipate heat from the computing board 240. The heat sink 230 may be attached to one side or two sides of the computing board 240. In this embodiment, the heat sink 230 is attached to two sides of the computing board 240; that is, the computing board 240 is sandwiched between two heat sinks 230. A bottom of the heat sink 230 is provided with a groove 231 configured to engage with the computing board bottom slide rail 141. The groove 231 and the computing board bottom slide rail 141 are configured to engage with each other to allow the computing apparatus 200 to enter or move out of the frame 100. In addition, two ends of the slide rail are provided with positioning and fixing structures, such as positioning strips and positioning protrusions. The positioning and fixing structures may alternatively be heat dissipation assemblies.

The groove 231 may be provided only at a bottom portion of one heat sink 230, or may be provided at bottom portions of two heat sinks 230.

In this application, the slide rail is provided on the heat sink; that is, the heat sink is used for supporting and sliding, which can effectively prevent the computing board from being deformed and damaged.

The top wall 130 is provided with a notch 131 arranged transversely. The power source interface 210 and the signal interface 220 on the computing board 240 of the computing apparatus 200 protrude above the frame 100 through the notch 131. With reference to FIG. 2, when the connection box 600 is connected to the top end of the frame 100, the power source interface 210 and the signal interface 220 are in the connection box 600.

The top wall 130 is provided with a computing board top slide rail 132 corresponding to the computing board bottom slide rail 141 on the bottom wall 140, and the computing board top slide rail 132 is formed by extrusion of an aluminum material at a side of the notch 131. Correspondingly, a top end of the heat sink 230 is provided with a groove 232 configured to engage with the computing board top slide rail 132. The top slide rail and bottom slide rail work together to provide precise and stable sliding.

Figure 7:
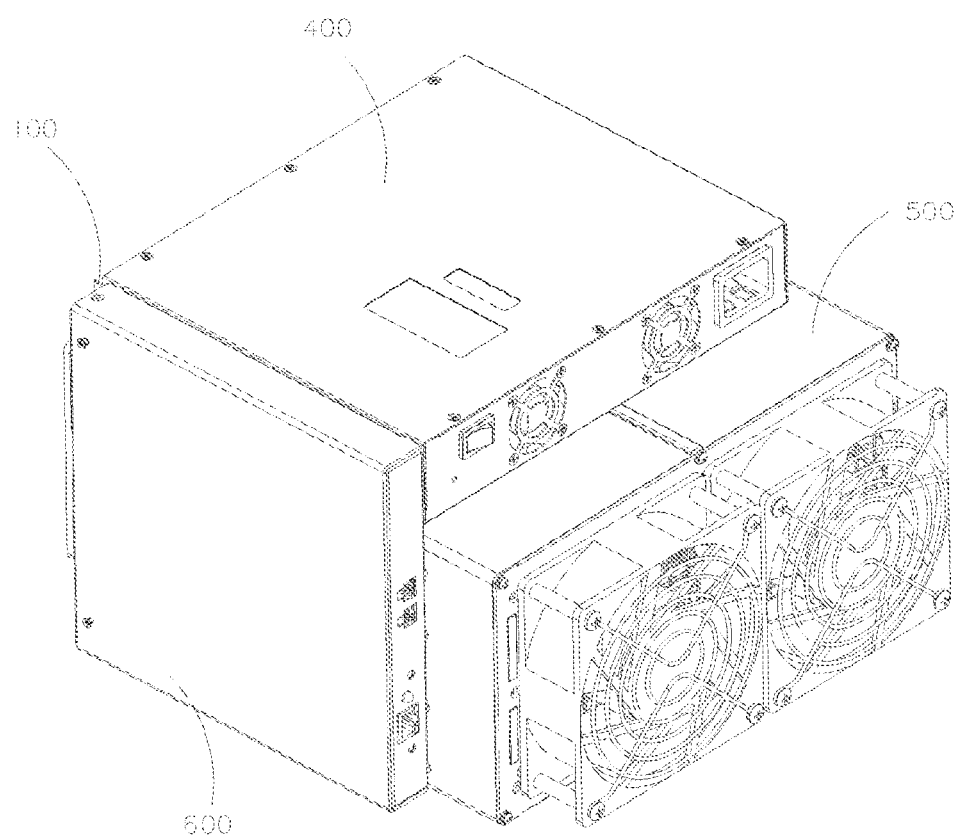
FIG. 7 is a three-dimensional structural diagram of a computing device according to an embodiment of this application.
Figure 8:
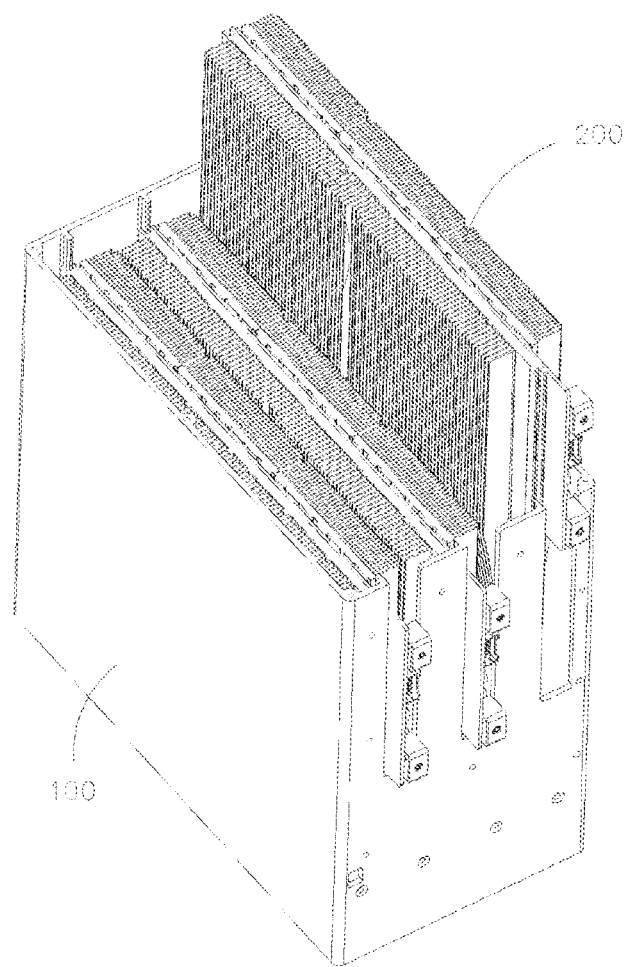
FIG. 8 is a three-dimensional structural diagram of a computing apparatus of a computing device connected to a frame according to an embodiment of this application.

A direction or location relationship indicated by the term "top end" or "upper side" described above is a direction or location relationship shown based on the accompanying drawings, which also includes an outermost end of a side surface. As shown in FIG. 7, in a three-dimensional structural diagram of a computing device according to an embodiment of this application, when the computing device shown in FIG. 1 is placed sideways, the connection box 600 is arranged on one side of the frame 100. As shown in FIG. 8, in a three-dimensional structural diagram of a computing apparatus of a computing device connected to a frame according to an embodiment of this application, the computing apparatus 200 moves in or out via the top portion of the frame 100. In addition, in order to simplify a chassis structure, the controller 300, the power source 400, and the heat dissipation device 500 may all be arranged in the frame 100 to improve the integrity and cleanliness of the frame structure.

Referring to FIG. 2 and FIG. 6 again, a plurality of computing assemblies 200 are arranged in parallel along the transverse direction X, and the controller 300 includes a plurality of control connection ends, each of which is connected to a signal interface of a corresponding computing apparatus 200. In addition, the conducting bar 700 is configured to connect the plurality of computing assemblies 200 in sequence for the computing assemblies 200 to be in connection with the power source 400.

This application may further have a plurality of other embodiments. A person skilled in the art may make various corresponding changes and variations according to this application without departing from the spirit and essence of this application. However, such corresponding changes and variations shall fall within the protection scope of the claims appended to this application.

INDUSTRIAL APPLICABILITY

The computing device of this application is provided with a sealable connection box; a power source and a power source wire of a computing board are connected in the connection box. Thus, various power source connection wires are sealed inside the connection box and are prevented from being exposed, which not only improves the safety and appearance, but also facilitates operations. The connection box is provided with an access in communication with the frame. The computing apparatus may slide out of or slide into the frame as a whole from the access without detaching other frame structures such as the connection box, which saves time and effort for maintenance.

What is claimed is:

1. A computing device, comprising a frame, a computing apparatus, a controller, a power source, and a heat dissipation device, wherein:
   the computing apparatus is arranged in the frame,
   the power source, the controller, and the heat dissipation device are connected outside the frame,
   the computing apparatus comprises a power source interface,
   the power source comprises a power source connection end,
   the computing device further comprises a connection box arranged on the frame and the power source,
   the power source connection end extends into the connection box, and
   the power source interface and the power source connection end are connected in the connection box via one or more conducting bars,
   wherein the connection box covers both a top of the frame and a top of the power source, and the power source is outside of the connection box,
   the connection box further comprises an access in communication with the frame, the power source interface extends from the top of the frame into the connection box through the access, the access comprises a side opening and a bottom opening that intersect to form a continuous passage, and the access allows the computing apparatus to be pulled out from the frame by detaching a corresponding conducting bar in the connection box without detaching the connection box.

2. The computing device according to claim 1, wherein:
   the computing apparatus comprises a signal interface,
   the controller comprises a signal connection end,
   the controller is arranged in the connection box, and
   the signal interface and the signal connection end are connected in the connection box via signal wire.

3. The computing device according to claim 1, wherein:
   the connection box comprises an upper cover plate and a bottom cover body, and
   the upper cover plate covers the bottom cover body to form the connection box.

4. The computing device according to claim 1, wherein the frame is an integrally formed aluminum piece.

5. The computing device according to claim 1, wherein:
   the frame comprises a first side wall, a second side wall, a top wall, and a bottom wall, and
   the first side wall and the second side wall are disposed between the top wall and the bottom wall.

6. The computing device according to claim 5, wherein:
   an outer portion of the first side wall comprises a power source slide rail,
   a power source bracket is disposed on the first side wall through the power source slide rail, and
   the power source is attached to the power source bracket.

7. The computing device according to claim 5, wherein:
   the bottom wall comprises a computing board bottom slide rail, and
   the computing apparatus is configured to slide into the frame or slide out of the frame through the computing board bottom slide rail.

8. The computing device according to claim 7, wherein:
   the computing apparatus comprises a heat sink, and
   the heat sink comprises a groove configured to engage with the computing board bottom slide rail.

9. The computing device according to claim 7, wherein:
   the computing apparatus comprises a signal interface,
   the controller comprises a signal connection end,
   the controller is arranged in the connection box,
   the signal interface and the signal connection end are connected in the connection box via signal wire,
   the top wall comprises a notch,
   the power source interface of the computing apparatus protrudes above the frame through the notch and extends into the connection box, and
   the signal interface of the computing apparatus protrudes above the frame through the notch and extends into the connection box.

10. The computing device according to claim 9, wherein:
the top wall comprises a computing board top slide rail corresponding to the computing board bottom slide rail, and
the computing board top slide rail is formed by extrusion of an aluminum material at a side of the notch.

11. The computing device according to claim 1, comprising a plurality of computing assemblies arranged in parallel, wherein the conducting bar is configured to connect the plurality of computing assemblies in sequence.

12. The computing device according to claim 1, wherein:
the heat dissipation device comprises a first fan and a second fan,
the frame is hollowed out at a front end and a rear end, and
the first fan and the second fan are connected to the front end and the rear end of the frame respectively to block the front end and the rear end of the frame.

13. The computing device according to claim 1, wherein the power source interface and the power source connection end are connected in the connection box via two conducting bars.

14. The computing device according to claim 1, wherein the one or more conducting bars are configured to fix relative positions of computing boards of the computing apparatus.

* * * * *